Patented Feb. 6, 1923.

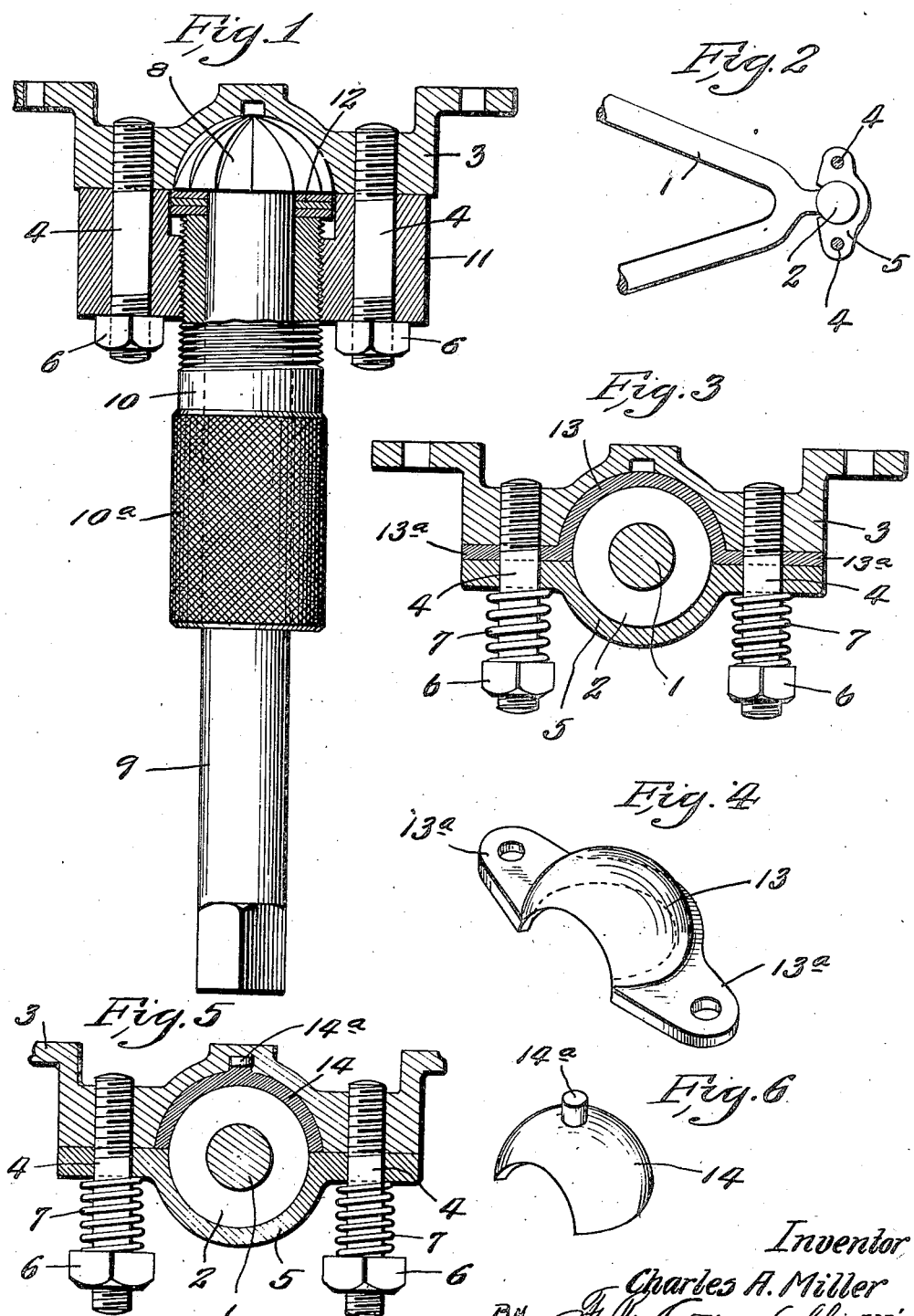

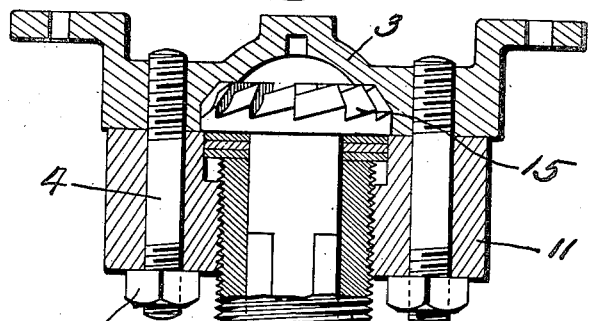
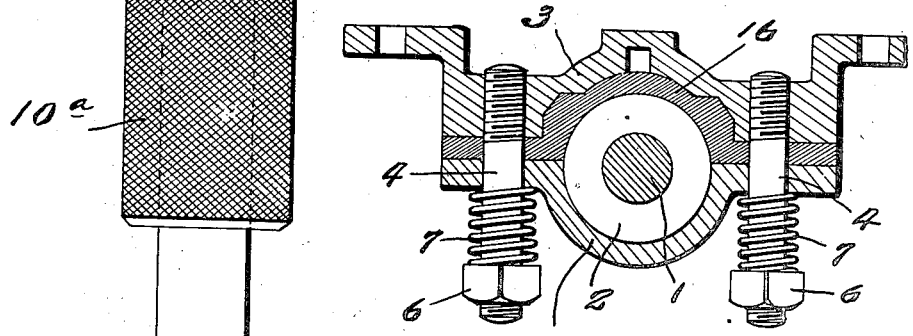
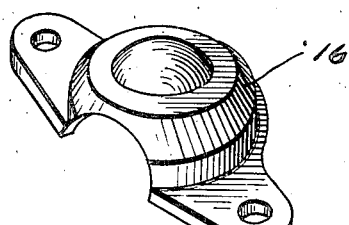
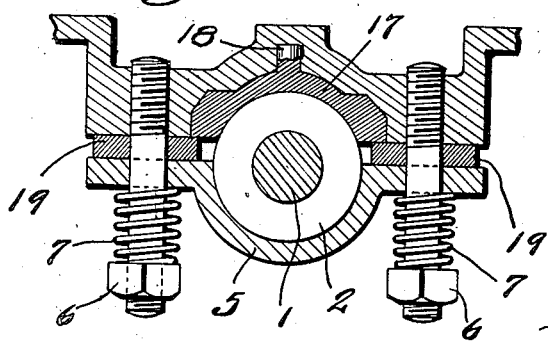
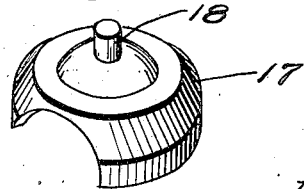

1,444,628

UNITED STATES PATENT OFFICE.

CHARLES A. MILLER, OF LONGVILLE, LOUISIANA.

METHOD OF TAKING UP WEAR IN BEARINGS.

Application filed March 7, 1921. Serial No. 450,215.

*To all whom it may concern:*

Be it known that I, CHARLES A. MILLER, a citizen of the United States, residing at Longville, parish of Beauregard, State of Louisiana, have invented a certain new and useful Improvement in Methods of Taking Up Wear in Bearings, of which the following is a full, clear, and exact description, such as will enable others skilled in the art to which it appertains to make and use the same, reference being had to the accompanying drawings, forming part of this specification, in which—

Figure 1 is a sectional view through a radius rod socket bearing showing my improved reaming tool in operative position relative thereto.

Figure 2 is a detail view of the ball and socket connection between the radius rod and the bearing on the engine casing.

Figure 3 is a sectional view through the radius rod bearing rebored with the liner in-position therein.

Figure 4 is a detail view of the liner.

Figure 5 is a sectional view showing a modified form of liner.

Figure 6 is a detail view of the liner shown in Figure 5.

Figures 7 to 9, inclusive, represent detail views of a modified form of my invention.

Figure 10 and 11 are similar views of another modified form.

This invention relates to a new and useful improvement in bearings for radius rods as used in a well known commercial type of automobile, the object being to rebore the bearing when worn so that it will be made of such size as to receive a liner, preferably formed of pressed metal, which liner will take up the wear in the original bearing and prevent rattling of the parts incident to a loose joint connection between the radius rod and the engine casing.

My invention also contemplates the use of an improved form of reaming tool for reboring the bearing of the engine casing, said tool being capable of manipulation in such a manner as to not require the removal of the engine casing from the chassis of the machine.

In the drawings, 1 indicates an ordinary radius rod and 2 the ball at the converging ends thereof. This radius rod, as is well known, is connected to the front axle of a machine and is subject to vibration, particularly when the machine is passing over rough roads, and this vibration will cause the ball 2 and the socket bearings which receive it to become worn. Usually, the greatest wear occurs in the socket bearings one of which indicated at 3 is permanently secured to the engine casing so that when this socket bearing becomes worn, it can be renewed, but to renew it requires dismantling the engine casing from the chassis and involves quite a little expense. Of course, when the bearing is worn and the ball fits loosely therein, the axle is placed under considerable strain due to such lost motion in this connection and considerable noise results from the rattling of the loose joint.

The socket bearing 3, which is secured to the engine casing, is provided with two threaded bolts 4 and ordinarily a cap piece 5, provided with perforated lugs or wings through which the bolts 4 pass, is used to hold the bolt 2 in position, this cap piece 5 being held against the socket 3 by means of nuts 6 and wear take-up and anti-rattling springs 7. It is, of course, obvious that the cap piece 5 can be renewed at little cost when worn, but where considerable wear exists in the socket bearing 3 I propose to rebore this socket bearing by means of a rose reaming head 8, mounted on the upper end of a shaft 9, the lower end of said shaft being formed rectangular in shape so as to receive a wrench (not shown) by which the reaming tool may be operated.

10 indicates a sleeve loosely mounted on the shaft 9, the lower end of which sleeve is preferably provided with a knurled surface 10ª, while its upper end is threaded to engage a nut 11. This nut 11 is provided with perforated lugs or wings registering with the bolts 4. When the nut 11 is secured in position against the socket bearing 3, the same as if the cap piece 5 were secured in position, said nut is held in fixed relation to said socket bearing.

Washers 12 are arranged between the ends of the sleeve 10 and the reaming head 8. After the nut 11 is secured in position, the sleeve 10 is rotated so as to bring the reaming tool into contact with the semispherical seat in the socket bearing 3, then a wrench is applied to the lower end of shaft 9, and said shaft and its carried reaming tool are rotated with one hand while the sleeve 10 is fed forward with the other, and consequently the operator can rebore and enlarge the semispherical bearing in the socket bearing 3. When the lower flat face of the reaming head 8 is flush with the lower face of the socket bearing 3, which the operator can readily determine by looking through the opening through which passes the shank of the radius rod, the reaming tool may be withdrawn and the nut 11 removed. The liner bearing 13 (shown in Figures 3 and 4) preferably made of pressed metal having perforated lugs or wings 13ª, is now placed in position on the underside of the socket bearing 3. The socket bearing 3 having been rebored to such a size as to accommodate the semispherical projection on the liner bearing 13, will, when said liner bearing is in position, lower the point of attachment of the brace to the engine casing approximately the thickness of the wings 13ª. This I deem unimportant. The inner surface or cavity of the liner bearing will ordinarily compensate for all worn surfaces on the old bearing and will make a tight fit with the ball when the radius rod is again placed in position and the cap 5 applied.

In Figures 5 and 6, I have shown a wingless liner bearing 14 having a projection 14ª designed to fit in the finished bore of the socket bearing 3. By this arrangement, when the socket bearing is rebored and the bearing liner 14 introduced into position, the ball of the radius rod is located in the same plane that it formerly occupied with the original bearing.

In Figures 7 to 9, I have shown a modified form of my invention in which a semi-truncated reaming tool is employed to enlarge the lower portion of the semispherical recesses in the socket bearing 3 so that a liner 16, such as shown in Figures 8 and 9, may be employed. This bearing liner 16 is preferably made of forged metal and the upper convexity of its dome-like surface is struck up from the same center as the inner concavity of its bearing surface.

In Figure 10, I have shown a liner 17 having a pin 18 to hold it in its central position; and to avoid the necessity of providing the liner 17 with wings, as shown in Figure 8, I may use a shim 19. The liner 17 is shown in detail in Figure 11. This semi-truncated reaming head 15 is cheaper in cost and requires less power to operate than the rose reamer 8, shown in Figure 1.

What I claim is:

1. A method of taking up wear in a socket bearing of automobiles, the same consisting in attaching a nut in juxtaposition to said bearing, operating a reaming tool through said nut to enlarge said bearing, removing said nut and reaming tool, interposing a bearing liner into the rebored bearing and finally clamping the connected parts together.

2. A method of taking up wear in a radius rod bearing for automobiles consisting in first enlarging the bearing seat in situ, introducing a bearing liner into the enlarged seat, and finally reassembling the parts constituting the bearing.

In testimony whereof I hereunto affix my signature this 5th day of March, 1921.

CHARLES A. MILLER.